United States Patent
Steer et al.

(10) Patent No.: US 7,110,351 B2
(45) Date of Patent: Sep. 19, 2006

(54) ENHANCED ARQ WITH OFDM MODULATION SYMBOLS

(75) Inventors: David G. Steer, Nepean (CA); Shalini S. Periyalwar, Ottawa (CA); Koon Hoo Teo, Nepean (CA); Yoon Chae Cheong, Kanata (CA); Bassam M. Hashem, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1003 days.

(21) Appl. No.: 09/739,367

(22) Filed: Dec. 19, 2000

(65) Prior Publication Data
US 2002/0075841 A1   Jun. 20, 2002

(51) Int. Cl.
*H04J 11/00* (2006.01)

(52) U.S. Cl. .................. 370/208; 370/208; 370/204; 370/344; 714/748; 714/749

(58) Field of Classification Search .......... 370/203, 370/208, 344, 319, 394, 206; 714/52, 748, 714/751, 752
See application file for complete search history.

(56) References Cited

U.S. PATENT DOCUMENTS

| | | | |
|---|---|---|---|
| 4,439,859 A * | 3/1984 | Donnan | 714/748 |
| 5,946,320 A * | 8/1999 | Decker | 370/428 |
| 6,028,844 A * | 2/2000 | Hao et al. | 370/242 |
| 6,275,488 B1 * | 8/2001 | Cudak et al. | 370/347 |

(Continued)

FOREIGN PATENT DOCUMENTS

WO    2004/054285    *    6/2004

OTHER PUBLICATIONS

Laneman et al, Soft Selection Combining for Terrestrial Digital Audio Broadcasting in the FM Band, Jun. 2001, IEE Transactions on Broadcastiong, vol. 47, pp. 103-113.*

(Continued)

*Primary Examiner*—Doris H. To
*Assistant Examiner*—Steven Blount

(57) ABSTRACT

A method and apparatus are provided for error correction in a communication system employing Orthogonal Frequency Division Multiplexing. When a remote unit receives an OFDM symbol, a retransmission indicator bit is examined to determine whether the symbol is an original symbol or a retransmitted symbol. If it is a retransmitted symbol and the remote unit has a corresponding symbol stored in memory, then the received symbol is soft-combined with the stored symbol. Each packet in the symbol, either the received symbol if original or the soft-combined symbol if retransmitted, is examined by the remote unit. If the remote unit determines that a particular packet is intended for the remote unit, but can not determine the contents of the payload of the packet, the remote unit sends a retransmission request to the base station for retransmission of the symbol. The base station determines whether the entire symbol or merely the packet should be retransmitted, based on such considerations as the size of the packet or whether there are additional requests for the symbol. The invention allows both soft-symbol combining and Automatic Repeat Request to be used as error correction techniques.

32 Claims, 6 Drawing Sheets

U.S. PATENT DOCUMENTS

| | | | |
|---|---|---|---|
| 6,278,685 B1* | 8/2001 | Yonge et al. | 370/203 |
| 6,359,877 B1* | 3/2002 | Rathonyi et al. | 370/349 |
| 6,418,143 B1* | 7/2002 | Rezaiifar et al. | 370/394 |
| 6,512,758 B1* | 1/2003 | Sato et al. | 370/344 |
| 6,603,826 B1* | 8/2003 | Cupo et al. | 375/346 |
| 6,628,641 B1* | 9/2003 | Strawczynski et al. | 370/349 |
| 6,654,921 B1* | 11/2003 | Jones et al. | 714/746 |
| 6,671,284 B1* | 12/2003 | Yonge et al. | 370/462 |
| 6,779,146 B1* | 8/2004 | Jones et al. | 714/748 |
| 2001/0008520 A1* | 7/2001 | Tiedemann et al. | 370/328 |
| 2003/0189892 A1* | 10/2003 | Son et al. | 370/208 |
| 2004/0233836 A1* | 11/2004 | Sumasu et al. | 370/206 |
| 2004/0255220 A1* | 12/2004 | Sudo et al. | 714/79 |
| 2004/0258134 A1* | 12/2004 | Cho et al. | 375/131 |

OTHER PUBLICATIONS

Chite et al, Soft Combining Hybrid ARQ Schemes Application to Reliable Communications within 3G Wiereless Networks, 2003 IEEE, pp. 1779-1783.*

Wang et al, A Soft Decision Decoding Scheme for Wireless COFDM with Application to DVB-T, Feb. 2004, IEEE Transactions on Consumer Electronics, vol. 50, No. 1, pp. 84-88.*

M. Raitola and H. Holma; Wideband CDMA Packet Data With Hybrid ARQ; Proceedings of IEEE 5$^{th}$ International Symposium on Spread Spectrum Techniques and Applications; 1998; vol. 1; pp. 318-322.

* cited by examiner

ENHANCED ARQ WITH OFDM MODULATION SYMBOLS

FIELD OF THE INVENTION

This invention relates to digital radio communication systems employing Orthogonal Frequency Division Multiplexing, and more particularly to forward error correction within such systems.

BACKGROUND OF THE INVENTION

In radio communication systems employing Orthogonal Frequency Division Multiplexing (OFDM systems), a base station transmits symbols to one or more remote units. Each symbol includes one or more packets, and different packets within a symbol may be intended for different remote units. Each packet includes a packet serial number, a receiver address, a header checksum, a payload, and a packet checksum. The packet serial number and the receiver address form a header. When a remote unit receives a symbol, it decodes the header of each packet to determine the receiver address of the packet. The remote unit notes packets whose receiver address matches the identity of the remote unit. The remote unit processes the payload of any such packets and passes the data in the payload to a user.

The remote unit performs error detection for a packet at two stages. When the remote unit decodes the header, the remote unit verifies the content of the header using the header checksum of the packet. If the header checksum indicates that the header contains no errors, and if the receiver address matches the identity of the remote unit, then the remote unit decodes the payload and verifies the content of the entire packet using the packet checksum.

Two standard techniques for error correction are Automatic Repeat Request (ARQ) and soft symbol combining. ARQ is a technique by which the remote unit requests retransmission of a packet. Soft symbol combining is a technique by which an entire symbol is retransmitted and the remote unit combines two samples of a symbol, the originally transmitted symbol and the retransmitted symbol, before decoding the symbol in order to reduce the likelihood of errors.

Current OFDM systems do not use ARQ, because OFDM is used primarily for television broadcasts which can not tolerate the delays arising from retransmission. However systems using OFDM for internet traffic can tolerate such delays. Error correction would be improved if the remote unit could combine ARQ with soft symbol combining. Unfortunately, in order to carry out soft symbol combining and take advantage of increased coding benefits, the smallest unit that can be retransmitted is a symbol. If there is only one packet for which retransmission is required, for example if the symbol contains packets for more than one remote unit and only one remote unit detected an error, then retransmission of the entire symbol is inefficient and a waste of bandwidth. Furthermore, retransmission of the symbol may lead to confusion in remote units which were able to decode their packets correctly.

SUMMARY OF THE INVENTION

The present invention provides a method implemented by a remote unit in a radio communication system which employs Orthogonal Frequency Division Multiplexing. The remote unit receives a symbol from a base station, each symbol including at least one packet. Each packet includes an address and a payload. The remote unit determines whether the symbol is a retransmitted symbol by, for example, examining a retransmission indicator bit included in the symbol header. If the symbol is a retransmitted symbol and a corresponding stored symbol is stored at the remote unit, the received symbol is soft-combined with the stored symbol. The remote unit then determines the address of each packet. If the address of a packet can be determined reliably and indicates that the remote unit is an intended recipient of the packet, the remote unit determines whether there is an error in the payload of the packet. If there is an error in the payload of the packet, the remote unit signals to the base station that the packet is to be retransmitted.

The present invention also provides a method implemented by a base station in a radio communication system which employs Orthogonal Frequency Division Multiplexing. The base station receives a retransmission request, the retransmission request including a symbol identifier and a packet identifier. The base station determines whether the retransmission request is for a packet or for a symbol. This determination may be made, for example, based on whether the retransmission request originated from a remote unit, in which case the retransmission request is for a symbol, or from an upper layer protocol within the base station or elsewhere within the communication system, in which case the retransmission request is for a packet. If the retransmission request is for a packet, and if the packet identified by the packet identifier is available at the base station as a stored packet, the base station retransmits the packet. If the retransmission request is for a symbol, if the symbol identified by the symbol identifier is available as a stored symbol, and if there are other pending retransmission requests for the symbol, the base station retransmits the symbol. If the retransmission request is for a symbol, if the symbol identified by the symbol identifier is available as a stored symbol, and if the packet identified by the packet identifier has a size larger than a threshold, the base station retransmits the symbol. If the retransmission request is for a symbol, if the packet identified by the packet identifier is available as a stored packet, and if the packet identified by the packet identifier has a size not larger than the threshold, the base station retransmits the packet.

The method provides improved error correction while efficiently using transmission resources. Either or both Automatic Repeat Request and soft-symbol combining can be used as error correction techniques as a particular situation warrants, while minimizing retransmission of unnecessary data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
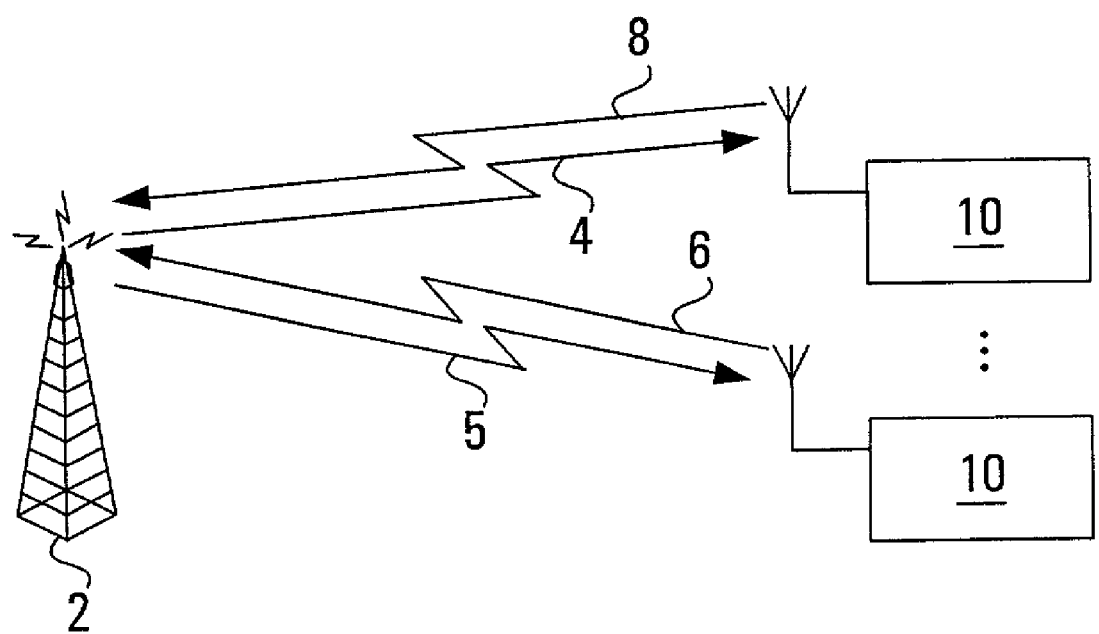
FIG. 1 is a block diagram of a portion of a radio communication system in which the invention is implemented.

Referring to FIG. 1, a portion of a radio communication system is shown. The radio communication system employs Coded Orthogonal Frequency Division Multiplexing (OFDM) to transmit traffic from a base station 2 to at least one remote unit 10. The traffic is transmitted over a forward link to each remote unit as a series of OFDM symbols, each OFDM symbol being transmitted over a plurality of subcarriers. Generally the symbols along the forward link 4 to one remote unit will be the same as the symbols along the forward link 5 to a second remote unit, although this will not be the case if the radio communication system employs a "smart antenna" system capable of adaptively adjusting its directional pattern. Each OFDM symbol includes one or more packets, each packet intended for one remote unit 10 in the case of single end-point transmissions (although more than one packet in a symbol may be intended for the same remote unit) or intended for more than one remote unit 10 in the case of multicast or broadcast transmissions. An OFDM symbol may also include a portion of a packet if the packet is too large for the symbol. The presence of only a portion of a packet has no impact on the invention, and in the description which follows any discussion of a packet will implicitly also refer to a portion of a packet. The remote units 10 transmit return signals 6 and 8 to the base station. Each return signal 6 and 8 is different. Although more than one remote unit is shown in FIG. 1 there may more generally be only one remote unit; however in such a case the advantages of the invention will not be realized.

Figure 2:
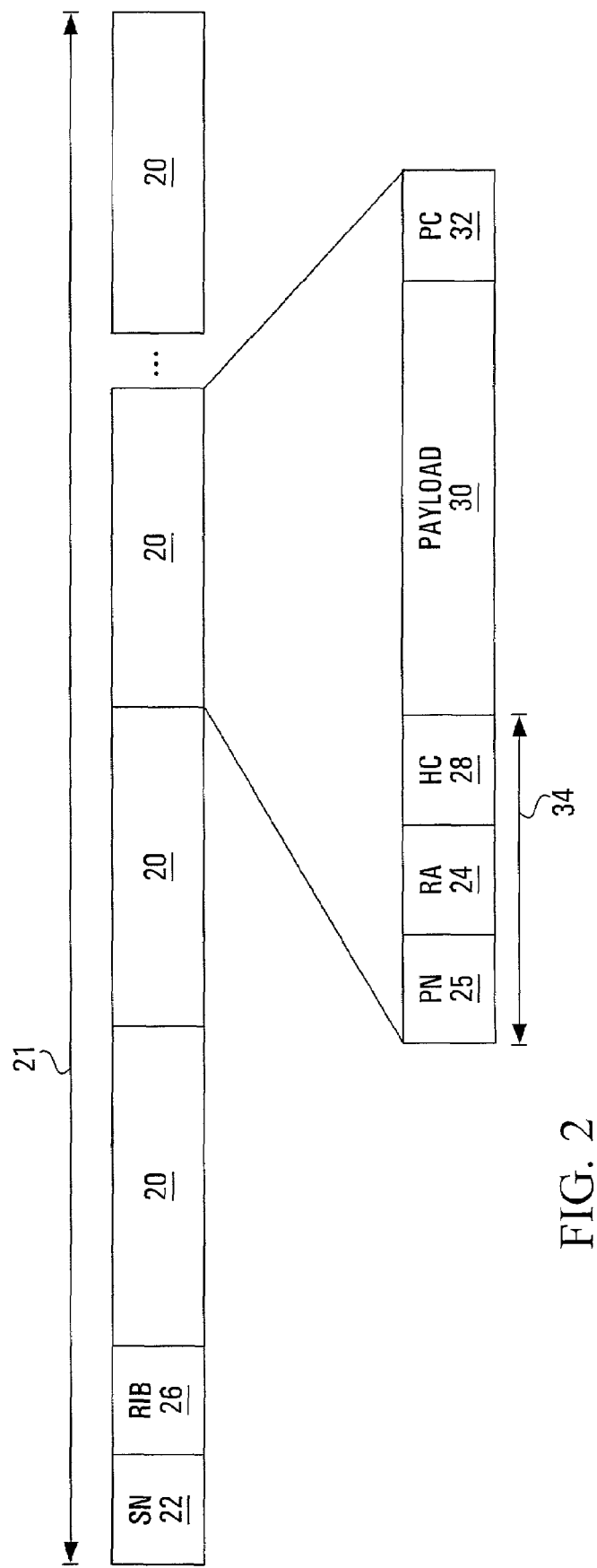
FIG. 2 is a diagram of an OFDM symbol format.

Referring to FIG. 2, the structure of an OFDM symbol 21 of the invention is shown. The OFDM symbol includes a symbol serial number 22, a retransmission indicator bit 26, and one or more packets 20, one of which is shown in greater detail. Each packet includes a packet serial number 25, a receiver address 24, a header checksum 28, a payload 30, and a packet checksum 32. The receiver address 24 is an indication of the intended recipient or recipients of the packet. The receiver address 24 may be any one of or a combination of an address of a remote unit 10, a group address of a plurality of remote units 10, a broadcast address, or a broadcast flag. Use of a group address allows multicast transmissions. Use of a broadcast address or of a broadcast flag allows broadcast transmissions. Other than the retransmission indicator bit 26, the presence of all of the fields is in conformance with current OFDM standards, although the contents of the symbol serial number 22 may be different, as described below, and the symbol serial number 22 is associated with the entire symbol rather than with each packet. The value of the retransmission indicator bit 26 indicates whether the symbol is an original symbol or whether it is a symbol that is being retransmitted. The packet serial number 25, receiver address 24, and header checksum 28 of each packet 20 collectively make up a packet header 34.

Figure 3:
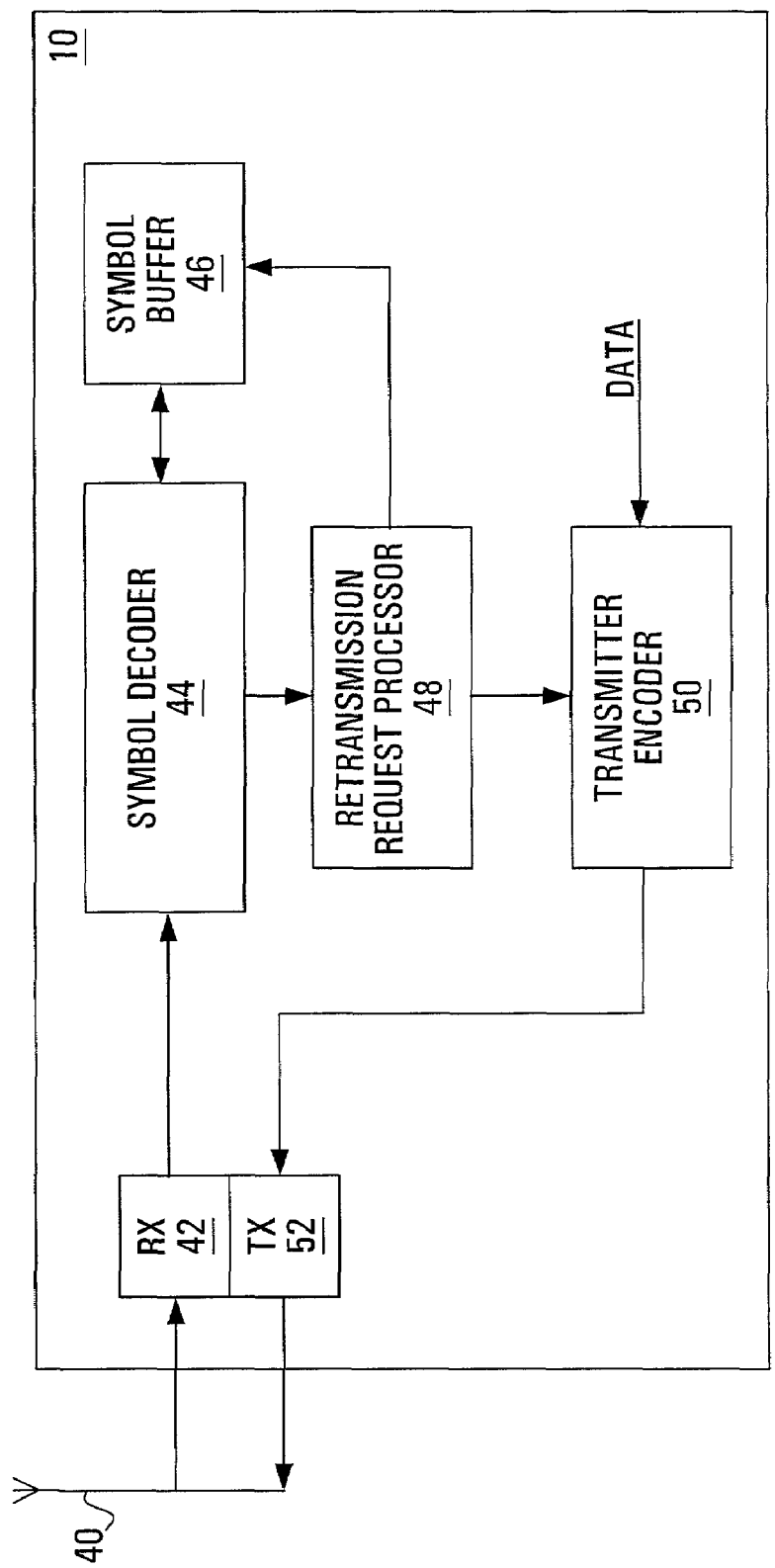
FIG. 3 is a block diagram of a portion of a remote unit in which the invention is implemented.

Referring to FIG. 3, a portion of a remote unit 10 is shown. A signal bearing an OFDM symbol is received at a transceiver antenna 40, which passes the signal to a receiver 42. The receiver 42 detects the symbol and passes it to a symbol decoder 44 and to other standard components (not shown) of the remote unit. The symbol decoder 44 decodes the OFDM symbol, separates the OFDM symbol into its constituent packets, and passes the symbol to a retransmission request processor 48. The retransmission request processor 48 may be a component of a larger processor, including the symbol decoder. The retransmission request processor 48 examines each packet to determine if any of the packets are destined for this particular remote unit. Any packets destined for this particular remote unit are further decoded and checked for errors by the retransmission request processor 48. If no errors are detected in a packet, the packet is passed to other standard components (not shown) of the remote unit for further processing before being sent to a user. If errors are detected in a packet, the retransmission request processor 48 signals a retransmission request to a transmitter encoder 50 and places the symbol in a symbol buffer 46. The transmitter encoder 50 combines the retransmission request with other data to be transmitted, formats and packages the combined information into symbols to be transmitted, and sends the combined information to a transmitter 52 where it is sent via the antenna 40 to the base station.

Figure 4:
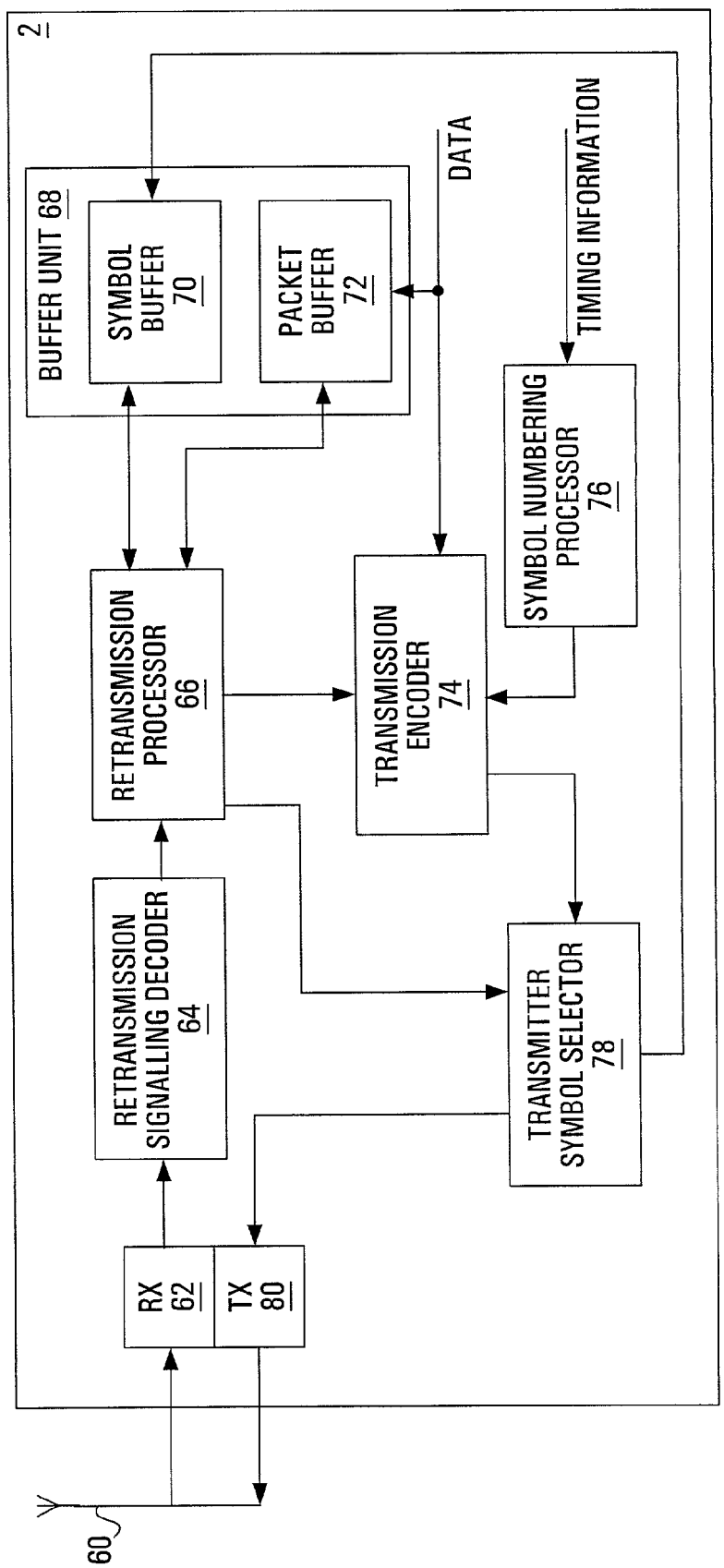
FIG. 4 is a block diagram of a portion of a base station in which the invention is implemented.

Referring to FIG. 4, a portion of a base station 2 is shown. A signal from a remote unit 10 is received at a transceiver antenna 60, which passes the signal to a receiver 62. The receiver 62 detects information within the signal and passes it to a retransmission signalling decoder 64 and to other standard components (not shown) of the base station. The retransmission signalling decoder 64 extracts any retransmission requests from the information and passes the retransmission requests to a retransmission processor 66. Either or both of the retransmission signalling decoder 64 and the retransmission processor 66 may be a component of a larger processor, such as a signalling decoder. The base station 2 includes a buffer unit 68 which stores either or both of previously transmitted symbols and packets. If both transmitted symbols and packets are stored in the buffer unit 68, they may be stored separately in a symbol buffer 70 and a packet buffer 72 respectively, as shown in FIG. 4, or they may be stored in a single buffer. The retransmission processor 66 examines each retransmission request and determines whether the indicated packet or symbol is available in the buffer unit 68.

The retransmission processor 66 determines whether a packet or a symbol is to be retransmitted, as described below and shown in FIG. 6. If the retransmission processor determines that a packet is to be retransmitted and the packet is available in the packet buffer 72, then the retransmission processor 66 retrieves the packet from the packet buffer 72 and passes it to a transmission encoder 74. The transmission encoder 74 combines the packet with other packets to be transmitted and encodes the combined packets into a symbol, which is then passed to a transmitter symbol selector 78. If the retransmission processor determines that a symbol is to be retransmitted and the symbol is available in the symbol buffer 70, then the retransmission processor 66 retrieves the symbol from the symbol buffer 70 and passes it to the transmitter symbol selector. The transmitter symbol selector 78 selects which symbols from either the retransmission processor 66 or the transmission encoder 74 will be transmitted next. This selection is based on parameters outside the scope of the invention, such as quality-of-service parameters, priority of the information being transmitted, and the availability of suitable radio channel conditions to reach the desired remote unit. The transmitter symbol selector 78 may therefore include a memory buffer (not shown) to allow storage of symbols until the appropriate transmission time.

The transmitter symbol selector 78 passes the selected symbol to a transmitter 80 where it is sent via the antenna 60 to the remote units 10.

In order to uniquely identify the symbols so as to unambiguously relate a retransmission request to a buffered symbol, a symbol numbering processor 76 provides information to the transmission encoder 74 so that each symbol can be numbered when first encoded. The symbol numbering processor may make use of timing information from other parts of the base station, such as frame numbering, super-frame numbering, and symbol timing information.

The buffer unit 68 is populated with symbols from the transmitter symbol selector 78 in case they are needed later in response to a retransmission request. Similarly, the buffer unit 68 is populated with packets before they are encoded in case they are needed later in response to a retransmission request. Since the buffer unit 68 is of finite size, symbols and packets are stored in a queue, such that new symbols and packets replace the oldest stored symbols and packets. Alternate buffer management techniques may be used, such as replacing symbols and packets whose reception has been acknowledged by their intended recipient remote units. Memory within the buffer unit may be conserved by only storing symbols and packets whose reception by their intended recipient remote units may be acknowledged.

Figure 5:
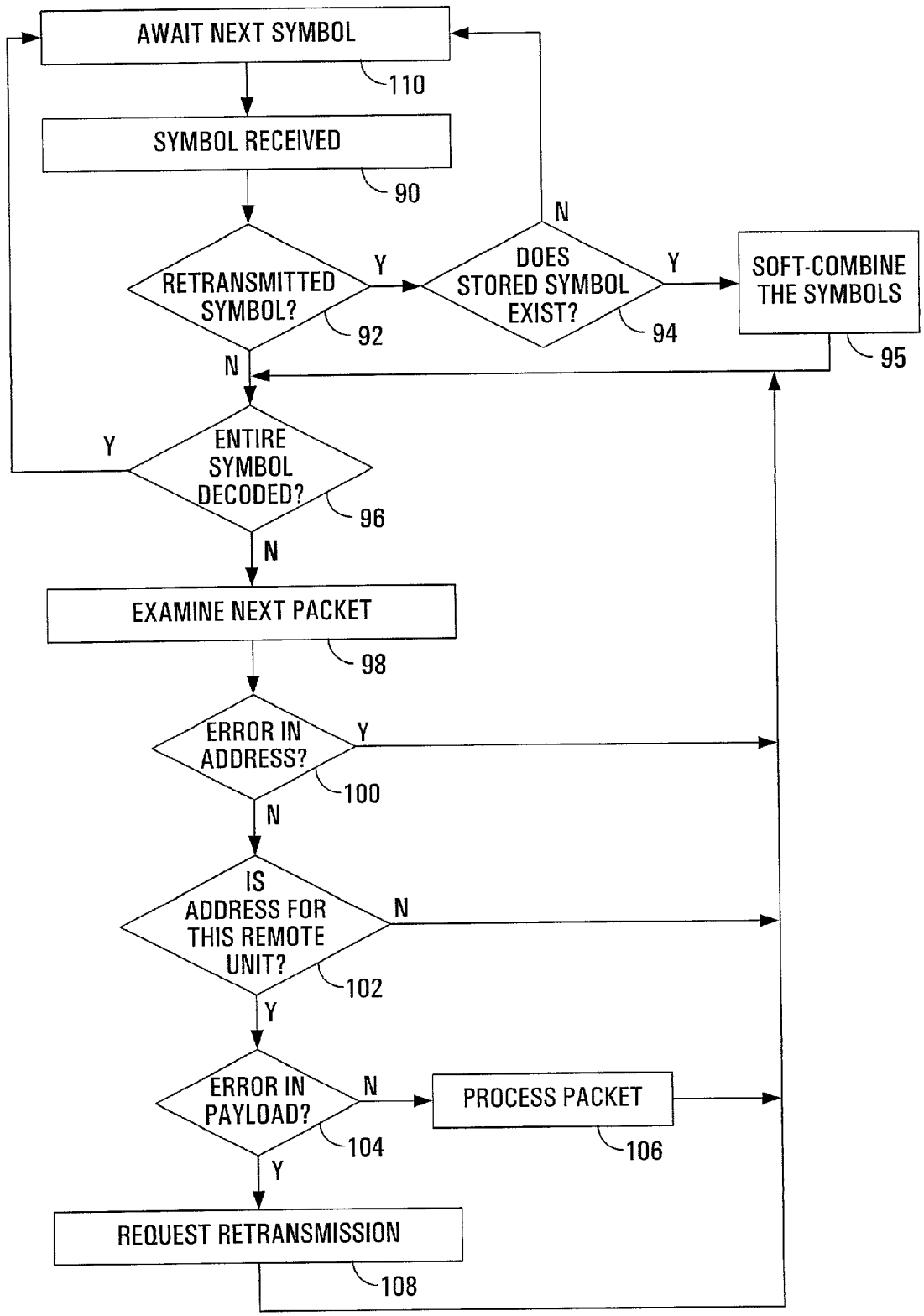
FIG. 5 is a flow chart of a method carried out by a remote unit according to the invention.

Referring to FIG. 5, a method carried out by each remote unit to determine whether retransmission of a symbol is required is shown. The remote unit awaits arrivals of OFDM symbols at step 110. When the remote unit receives a symbol at step 90, the symbol decoder decodes the received symbol. At step 92 the symbol decoder determines whether the received symbol is a retransmitted symbol. A retransmitted symbol is indicated by the retransmission indicator bit, described above. If the symbol decoder determines that the received symbol is a retransmitted symbol, then at step 94 the symbol decoder determines if a stored symbol having the same symbol serial number as the received symbol is stored in the symbol buffer. If such a stored symbol exists, the symbol decoder soft-combines the received symbol and the corresponding stored symbol at step 95 and then passes the combined symbol to the retransmission request processor. (Soft-combining of symbols is described in Raitola, M. and Holma, H. "Wideband CDMA Packet Data with hybrid ARQ", Proceedings of IEEE $5^{th}$ International Symposium on Spread Spectrum Techniques and Applications, 1998, Vol. 1, pp. 318–322, incorporated by reference herein.) If the symbol serial number of the received symbol does not match the symbol serial number of any buffered symbols, then this is a retransmission which was not requested by the remote unit. The symbol is discarded and the remote unit awaits the arrival of the next symbol at step 110.

The received symbol (if no soft-combining is required) or the combined symbol (if soft-combining is required) is passed to the retransmission request processor. At step 96 the retransmission request processor begins to loop through the packets within the symbol. If there is at least one more packet to be examined, then the retransmission request processor examines the next packet to be examined at step 98. Once all the packets within the symbol have been examined, then the remote unit enters a wait state at step 110 while it awaits the arrival of the next symbol.

For each packet, the retransmission request processor uses the header checksum to determine at step 100 whether there is an error in the header of the packet. If there is an error in the header of the packet, then the receiver address of the packet can not be determined reliably. In such a case, the remote unit can not determine whether this packet was destined for the remote unit. The retransmission request processor ignores the packet as it will be retransmitted by higher level protocols, and the loop returns to step 96 to determine whether there are any more packets in the symbol. If there is no error in the header of the packet, then the receiver address can be determined reliably. At step 102 the retransmission request processor determines whether the receiver address of the packet indicates that this remote unit is an intended recipient of the packet. If the receiver address does not indicate that this remote unit is an intended recipient of the packet, then the retransmission request processor ignores the packet.

If the receiver address does indicate that this remote unit is an intended recipient of the packet, then at step 104 the retransmission request processor uses the payload checksum to determine whether there is an error in the payload. If there is no error in the payload, then the retransmission request processor passes the packet to other components of the remote unit at step 106 for further processing before the packet is passed to a user. If there is an error in the payload, then the retransmission request processor passes the symbol to the symbol buffer for storage. The retransmission request processor also prepares a retransmission request at step 108 using the symbol serial number and the packet serial number, and passes the retransmission request to the transmitter encoder. The retransmission request processor then examines the next packet in the symbol, if one exists.

Figure 6:
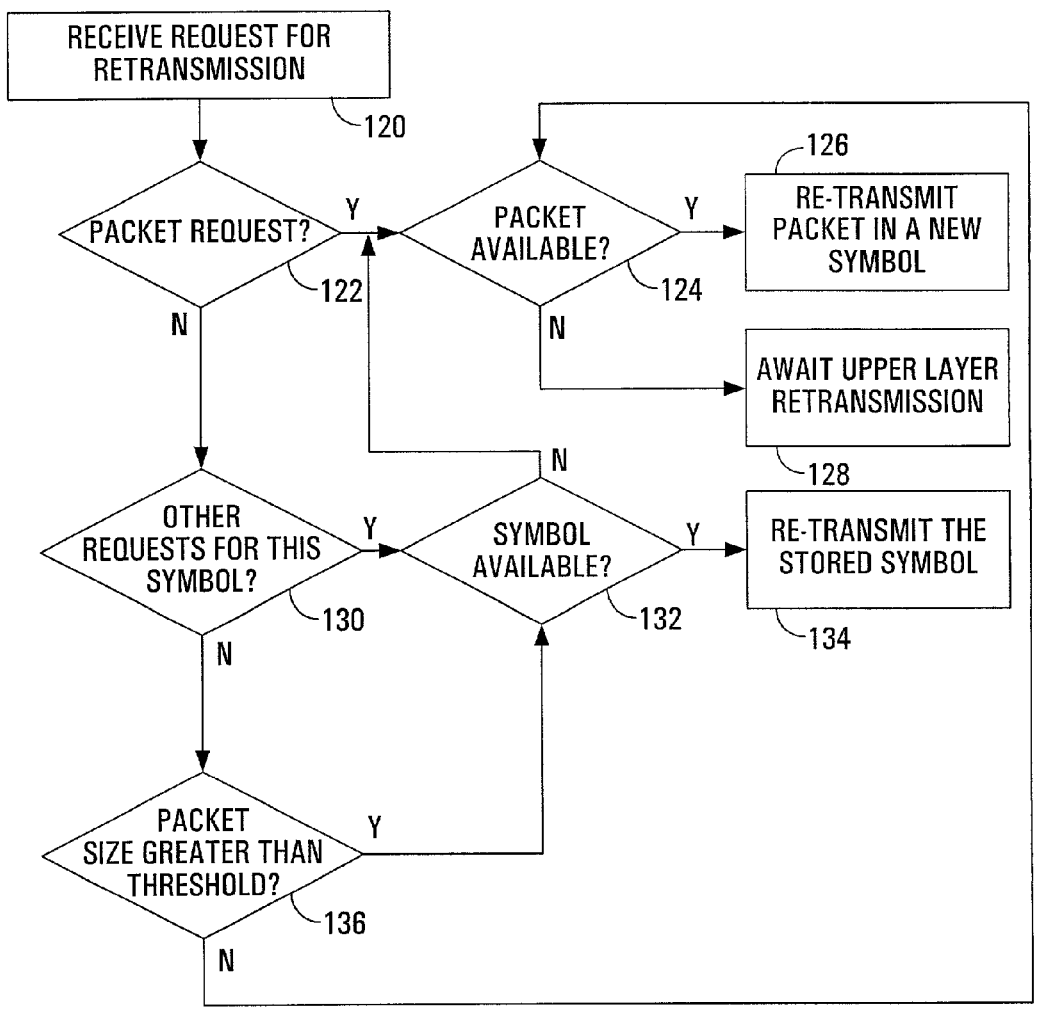
FIG. 6 is a flow chart of a method carried out by a base station according to the invention.

Referring to FIG. 6, a method carried out by the base station to handle retransmission requests is shown. At step 120 the base station receives a retransmission request from a remote unit. The retransmission request is passed to the retransmission processor, which determines at step 122 whether the retransmission request is a request for retransmission of a packet or of a symbol. If the retransmission request is received from the remote unit via a signalling channel, then the retransmission request is a result of the method shown in FIG. 5 and is for retransmission of a symbol. A retransmission request may also arrive from an upper layer protocol within the base station or elsewhere within the communication system if the remote unit fails to acknowledge receipt of a packet or symbol, in which case the retransmission request is for retransmission of a packet. If the request is for retransmission of a packet, then at step 124 the retransmission processor determines the packet serial number of the request, and determines whether the original packet is available in the packet buffer. If the original packet is available in the packet buffer, then at step 126 the retransmission processor retrieves the original packet and passes it to the transmission encoder for retransmission. If the original packet is not available at step 124, then the retransmission processor ignores the request as the packet will be retransmitted by higher layer protocols.

If at step 122 the retransmission processor determines that the request is for retransmission of a symbol, then at step 130 the retransmission processor determines whether other retransmission requests for this symbol have been received but not yet processed. If other such requests are pending, then more than one remote unit would benefit from retransmission of the symbol. At step 132 the retransmission processor determines whether the original symbol is available in the symbol buffer by comparing the symbol serial number in the retransmission request with the symbol serial number of the symbols stored in the symbol buffer. If the original symbol is available in the symbol buffer, then at step 134 the retransmission processor retrieves the original symbol and passes it to the transmitter symbol selector for retransmission. If the original symbol is not available at step 132, then the retransmission processor attempts to retransmit only the packet identified in the request and treats the request as if it were a request for retransmission of a packet. The retransmission processor determines at step 124 whether the packet is available in the packet buffer, and if so, sends the packet to the transmission encoder at step 126 for retransmission.

If the retransmission processor determines at step 130 that there are no other pending requests for retransmission of the symbol, then it may be a waste of transmission resources to retransmit the entire symbol. At step 136 the retransmission processor compares the size of the packet with a threshold. The threshold may be set, for example, at half the size of a symbol. If the packet size is greater than the threshold, then the retransmission processor attempts to retransmit the entire symbol, and the algorithm proceeds to step 132. Retransmission of the entire symbol is advantageous in this case because it allows the remote unit which sent the retransmission request to perform soft-combining of the symbol. If the packet size is not greater than the threshold, then the retransmission processor attempts to retransmit only the packet in order to save transmission resources, and the algorithm proceeds to step 124.

The invention has been described with respect to a communication system employing coded OFDM. More generally, the invention is applicable to systems employing any OFDM including non-encoded OFDM. If the communication system is employing coded OFDM, an additional indicator of an error is possible. If the symbol decoder 44 in the remote unit 10 is unable to decode the symbol due to an error in the symbol, then the symbol decoder may place the symbol in the symbol buffer 46. In such a situation the remote unit does not signal to the base station that a retransmission is necessary, because of the low likelihood that any packets in the symbol were destined for the remote unit. However, if the base station retransmits the symbol for other reasons (for example, due to retransmission requests by other remote units), then upon receipt by the remote unit of the retransmitted symbol the remote unit can soft-combine the stored symbol with the retransmitted symbol to improve error correction. However, the infrequency with which such a symbol contained a packet destined for the remote unit, the low probability that the entire symbol would be retransmitted, and the only slight improvement in error correction, may not be worth the extra memory needed to store all such symbols.

The invention has been described using packet serial numbers and symbol serial numbers in a retransmission request to identify the packet or symbol to be retransmitted by the base station. More generally, the retransmission request can include any packet identifier of the packet to be retransmitted and any symbol identifier of the symbol to be retransmitted. For example, the packet identifier can be an offset from a known reference packet, and the symbol identifier can be an offset from a known reference symbol. As another example, the packet identifier and the symbol identifier may be implicit, in that reception of a retransmission request from a remote unit may implicitly identify the packet and the symbol to be retransmitted as being the last packet and symbol transmitted to the remote unit.

The invention has been described using a retransmission indicator bit to indicate to a remote unit whether a received symbol is a retransmitted symbol or an original symbol. Alternatively, a remote unit may determine that a received symbol is a retransmitted symbol by comparing the symbol serial number of the received symbol with the symbol serial number of a previously received symbol. If the symbol numbering processor 76 assigns symbol serial numbers such that the symbol serial numbers continuously increase, then the remote unit can store the highest symbol serial number it has received, updating the stored highest symbol serial number as higher symbol serial numbers are received. If the symbol serial number of a newly received symbol is less than the stored highest symbol serial then the remote unit determines that the newly received symbol is a retransmitted symbol. Of course, a similar method can be used if the symbol numbering processor 76 assigns continuously decreasing symbol serial numbers.

Although an OFDM symbol will usually include one or more complete packets, an OFDM symbol may include only a portion of a packet if a packet received from a user is too large to be contained in a single symbol. Such a packet will be effectively divided by the radio communication system into more than one packet, each having the same packet identifier in its packet header, but each being included in a different OFDM symbol. In such a case, the invention is applied in the same manner as when an OFDM symbol includes an entire packet. If a remote unit determines that the portion of a packet is intended for the remote unit, but there are errors in the payload of the portion of the packet, the remote unit sends a retransmission request identifying the symbol and the packet to the base station. The base station will determine whether to retransmit the symbol or the packet, as described above. If the base station determines that the packet is to be retransmitted, the entire packet is retransmitted, and not just the portion of the packet whose payload was determined by the remote unit to have errors.

What has been described is merely illustrative of the application of the principles of the invention. Other arrangements and methods can be implemented by those skilled in the art without departing from the spirit and scope of the present invention. Each processor described above, in particular the retransmission request processor, the retransmission processor, and the symbol numbering processor, may be any computing apparatus containing logic for executing the described functionality. For example, any of the processors may be a single processor, more than one processor, or a component of a larger processor. The logic may comprise external instructions or internal circuitry.

We claim:

1. A method by a remote unit in a radio communication system which employs Orthogonal Frequency Division Multiplexing, the method comprising the steps of:

receiving received OFDM symbols from a base station, each symbol including at least one packet, at least some symbols containing multiple packets, each packet including an address and a payload, the symbols collectively including packets addressed to the remote unit and packets addressed to other remote units;

for each received symbol, determining whether a received symbol is a retransmitted symbol;

if the received symbol is a retransmitted symbol and a stored symbol corresponding to the received symbol is stored at the remote unit, performing soft-combining of the received symbol and the stored symbol;

determining whether the address of each packet corresponding to the received symbol can be determined reliably;

if the address of a packet can be determined reliably, the further steps of:

determining the address of the packet;

determining whether the address of the packet indicates that the remote unit is an intended recipient of the packet; and if the remote unit is an intended recipient of the packet, the further steps of:

determining whether there is an error in the payload of the packet; and if there is an error in the payload of the packet, the further steps of:

signalling to the base station that the packet is to be retransmitted; and storing the received symbol in a buffer.

2. The method of claim 1 wherein each received symbol includes a retransmission indicator bit, and the step of determining whether a received symbol is a retransmitted symbol examines the retransmission indicator bit.

3. The method of claim 1 wherein the step of signalling to the base station that the packet is to be retransmitted includes transmitting a retransmission request, the retransmission request including a packet identifier and a symbol identifier.

4. The method of claim 1 wherein the radio communication system employs coded Orthogonal Frequency Division Multiplexing, and the method further comprising the steps of:

determining whether the received symbol can be successfully decoded; and if the received symbol can not be successfully decoded, storing the received symbol in the buffer.

5. A remote unit for a radio communication system which employs Orthogonal Frequency Division Multiplexing, the remote unit comprising:

a receiver for receiving received OFDM symbols from a base station, each symbol including at least one packet, at least some symbols containing multiple packets, each packet including an address and a payload, the symbols collectively including packets addressed to the remote unit and packets addressed to other remote units;

a symbol buffer for storing at least one stored symbol;

a symbol decoder coupled to the symbol buffer and operating to:

determine whether a received symbol is a retransmitted symbol;

determine whether a stored symbol corresponding to the received symbol is stored within the symbol buffer; and perform soft-combining of the received symbol and the stored symbol corresponding to the received symbol in the event that the received symbol is a retransmitted symbol and that a stored symbol corresponding to the received symbol is stored within the symbol buffer;

a retransmission request processor coupled to the symbol decoder so as to receive a symbol from the symbol decoder, coupled to the symbol buffer, and operating to:

determine whether the address of each packet corresponding to the symbol received from the symbol decoder can be determined reliably;

determine the address of a packet in the event that the address of the packet can be determined reliably;

determine whether the address of a packet indicates that the remote unit is an intended recipient of the packet in the event that the address of the packet can be determined reliably;

determine whether there is an error in the payload of a packet;

place the symbol in the symbol buffer in the event that the address of the packet can be determined reliably, that the address of the packet indicates that the remote unit is an intended recipient of the packet, and that there is an error in the payload of the packet; and prepare a retransmission request for transmission to the base station in the event that the address of the packet can be determined reliably, that the address of the packet indicates that the remote unit is an intended recipient of the packet, and that there is an error in the payload of the packet.

6. The remote unit of claim 5 wherein each received symbol includes a retransmission indicator bit, and the symbol decoder determines whether a received symbol is a retransmitted symbol by examining the retransmission indicator bit.

7. The remote unit of claim 5 wherein the retransmission request processor prepares a retransmission request so as to include a packet identifier and a symbol identifier.

8. The remote unit of claim 5 wherein the radio communication system employs coded Orthogonal Frequency Division Multiplexing, and wherein the symbol decoder further operates to:

decode the received symbol; and store the received symbol in the symbol buffer in the event that the received symbol can not be decoded successfully.

9. A remote unit for a radio communication system which employs Orthogonal Frequency Division Multiplexing, the remote unit comprising:

a receiver for receiving received OFDM symbols from a base station, each symbol including at least one packet, at least some symbols containing multiple packets, each packet including an address and a payload, the symbols collectively including packets addressed to the remote unit and packets addressed to other remote units;

a buffer for storing at least one stored symbol;

means for determining whether a received symbol is a retransmitted symbol;

means for performing soft-combining of the received symbol and a stored symbol in the event that the received symbol is a retransmitted symbol and that a stored symbol corresponding to the received symbol is stored within the buffer;

means for determining whether the address of each packet corresponding to the received symbol can be determined reliably;

means for determining the address of a packet;

means for determining whether the address of a packet indicates that the remote unit is an intended recipient of the packet;

means for determining whether there is an error in the payload of a packet;

means for signalling to the base station that a packet is to be retransmitted in the event that the address of the packet can be determined reliably, that the address of the packet indicates that the remote unit is an intended recipient of the packet, and that there is an error in the payload of the packet; and means for storing the received symbol in the buffer in the event that the address of the packet can be determined reliably, that the address of the packet indicates that the remote unit is an intended recipient of the packet, and that there is an error in the payload of the packet.

10. The remote unit of claim 9 wherein each received symbol includes a retransmission indicator bit, and the means for determining whether a received symbol is a retransmitted symbol comprise means for examining the retransmission indicator bit.

11. The remote unit of claim 9 wherein the means for signalling to the base station that a packet is to be retransmitted include means for transmitting a retransmission request, the retransmission request including a packet identifier and a symbol identifier.

12. The remote unit of claim 9 wherein the radio communication system employs coded Orthogonal Frequency Division Multiplexing, and wherein the remote unit further comprises means for storing the received symbol in the buffer in the event that the received symbol can not be decoded successfully.

13. A processor in a remote unit for a radio communication system which employs Orthogonal Frequency Division Multiplexing, the processor including instructions for:
receiving OFDM symbols as input, each symbol including at least one packet, at least some symbols containing multiple packets, each packet including an address and a payload, the symbols collectively including packets addressed to the remote unit and packets addressed to other remote units,
determining whether the address of a packet can be determined reliably;
determining the address of a packet, in the event that the address of the packet can be determined reliably;
determining whether the address of a packet indicates that the remote unit is an intended recipient of the packet;
determining whether there is an error in the payload of a packet;
signalling to a transmission encoder that a packet is to be retransmitted in the event that the address of the packet can be determined reliably, that the address of the packet indicates that the remote unit is an intended recipient of the packet, and that there is an error in the payload of the packet; and
storing the symbol to which a packet corresponds in a buffer in the event that the address of the packet can be determined reliably, that the address of the packet indicates that the remote unit is an intended recipient of the packet, and that there is an error in the payload of the packet.

14. A method by a base station in a radio communication system which employs Orthogonal Frequency Division Multiplexing, the method comprising the steps of:
transmitting at least one OFDM symbol, each symbol including at least one packet;
receiving a retransmission request, the retransmission request including a packet identifier and a symbol identifier;
determining whether the retransmission request is for a packet or for a symbol;
if the retransmission request is for a packet, and if the packet identified by the packet identifier is available as a stored packet, retransmitting the packet;
if the retransmission request is for a symbol, if the symbol identified by the symbol identifier is available as a stored symbol, and if there are other pending retransmission requests for the symbol, retransmitting the symbol;
if the retransmission request is for a symbol, if the symbol identified by the symbol identifier is available as a stored symbol, and if the packet identified by the packet identifier has a size larger than a threshold, retransmitting the symbol; and
if the retransmission request is for a symbol, if the packet identified by the packet identifier is available as a stored packet, and if the packet identified by the packet identifier has a size not larger than the threshold, retransmitting the packet.

15. The method of claim 14 wherein the step of determining whether the retransmission request is for a packet or for a symbol comprises the steps of:
determining whether the retransmission request originated from a remote unit, or from an upper layer protocol within the communication system;
determining that the retransmission request is for a symbol if the retransmission request originated from a remote unit; and
determining that the retransmission request is for a packet if the retransmission request originated from an upper layer protocol within the communication system.

16. A base station for a radio communication system which employs Orthogonal Frequency Division Multiplexing, the base station the base station comprising:
means for transmitting at least one OFDM symbol, each symbol including at least one packet;
means for receiving a retransmission request, the retransmission request including a symbol identifier and a packet identifier;
a retransmission processor coupled to a buffer unit, coupled to a transmission encoder, coupled to a transmitter symbol selector, and operating to:
determine whether the retransmission request is for a packet or for a symbol;
retrieve from the buffer unit a packet identified by the packet identifier and pass the retrieved packet to the transmission encoder in the event that:
the retransmission request is for a packet and the packet identified by the packet identifier is available in the buffer unit; or
the retransmission request is for a symbol, the packet identified by the packet identifier is available in the buffer unit, and the packet identified by the packet identifier has a size not larger than a threshold; and
retrieve from the buffer unit a symbol identified by the symbol identifier and pass the retrieved symbol to the transmitter symbol selector in the event that:
the retransmission request is for a symbol, a symbol identified by the symbol identifier is available in the buffer unit, and there are other pending retransmission requests for the symbol; or
the retransmission request is for a symbol, a symbol identified by the symbol identifier is available in the buffer unit, and the packet identified by the packet identifier has a size larger than a threshold.

17. The base station of claim 16 wherein each transmitted symbol includes a retransmission indicator bit whose value depends on whether the symbol is an original symbol or a retransmitted symbol.

18. The base station of claim 16 wherein each transmitted symbol includes a symbol serial number, and the base station further comprising a symbol numbering processor for generating a symbol serial number based on timing information.

19. The base station of claim 16 wherein the retransmission processor determines that the retransmission request is for a symbol in the event that the retransmission request originated from a remote unit, and determines that the retransmission request is for a packet in the event that the retransmission request originated from an upper layer protocol within the communication system.

20. A base station for a radio communication system which employs Orthogonal Frequency Division Multiplexing, the base station comprising:
means for transmitting at least one OFDM symbol, each symbol including at least one packet;

means for receiving a retransmission request, the retransmission request including a symbol identifier and a packet identifier;

means for determining whether the retransmission request is for a packet or for a symbol;

means for retransmitting a packet in the event that:

the retransmission request is for a packet and the packet identified by the packet identifier is available as a stored packet; or the retransmission request is for a symbol, the packet identified by the packet identifier is available as a stored packet, and the packet identified by the packet identifier has a size not larger than a threshold; and means for retransmitting a symbol in the event that the retransmission request is for a symbol, that the symbol identified by the symbol identifier is available as a stored symbol, and that:

there are other pending retransmission requests for the symbol; or the packet identified by the packet identifier has a size larger than a threshold.

21. The base station of claim 20 wherein each transmitted symbol includes a retransmission indicator bit whose value depends on whether the symbol is an original symbol or a retransmitted symbol.

22. The base station of claim 20 wherein each transmitted symbol includes a symbol serial number, and the base station further comprising means for generating a symbol serial number based on timing information.

23. The base station of claim 20 wherein the means for determining whether the retransmission request is for a packet or for a symbol comprise:

means for determining whether the retransmission request originated from a remote unit, or from an upper layer protocol within the communication system;

means for determining that the retransmission request is for a symbol in the event that the retransmission request originated from a remote unit; and means for determining that the retransmission request is for a packet in the event that the retransmission request originated from an upper layer protocol within the communication system.

24. A processor in a base station for a radio communication system which employs Orthogonal Frequency Division Multiplexing, the processor including instructions for:

receiving as input a retransmission request, the retransmission request including a symbol identifier that identifies an OFDM symbol and a packet identifier;

determining whether the retransmission request is for a packet or for a symbol;

retrieving a stored packet and passing the stored packet to a transmission encoder, in the event that:

the retransmission request is for a packet and the packet identified by the packet identifier is available as a stored packet; or the retransmission request is for a symbol, the packet identified by the packet identifier is available as a stored packet, and the packet identified by the packet identifier has a size not larger than a threshold; and retrieving a stored symbol and passing the stored symbol to a transmission encoder, in the event that the retransmission request is for a symbol, that the symbol identified by the symbol identifier is available as a stored symbol, and that:

there are other pending retransmission requests for the symbol; or the packet identified by the packet identifier has a size larger than a threshold.

25. The processor of claim 24 wherein the instructions for determining whether the retransmission request is for a packet or for a symbol include instructions for:

determining whether the retransmission request originated from a remote unit, or from an upper layer protocol within the communication system;

determining that the retransmission request is for a symbol in the event that the retransmission request originated from a remote unit; and determining that the retransmission request is for a packet in the event that the retransmission request originated from an upper layer protocol within the communication system.

26. A method in a radio communication system which employs Orthogonal Frequency Division Multiplexing, the radio communication system comprising a base station and at least one remote unit, each remote unit receiving received symbols from a base station, the method comprising the steps of:

the base station transmitting OFDM symbols to the at least one remote unit, each symbol including at least one packet, each packet including an address and a payload;

each remote unit receiving OFDM symbols from the base station;

at each remote unit, determining whether a received OFDM symbol is a retransmitted symbol;

if the received symbol is a retransmitted symbol and a stored symbol corresponding to the received symbol is stored at the remote unit, performing soft-combining of the received symbol and the stored symbol at the remote unit;

determining whether the address of each packet corresponding to the received symbol can be determined reliably at the remote unit;

if the address of a packet can be determined reliably, the further steps of:

determining the address of the packet at the remote unit;

determining whether the address of the packet indicates that the remote unit is an intended recipient of the packet; and if the address of a packet indicates that the remote unit is an intended recipient of the packet, the further steps of:

determining whether there is an error in the payload of the packet at the remote unit; and if there is an error in the payload of the packet, the further steps of:

signalling to the base station that the packet is to be retransmitted; and storing the received symbol in a buffer at the remote unit;

receiving a retransmission request at the base station, the retransmission request including a symbol identifier and a packet identifier;

at the base station, determining whether the retransmission request is for a packet or for a symbol;

if the retransmission request is for a packet, and if the packet identified by the packet identifier is available as a stored packet, the base station retransmitting the packet;

if the retransmission request is for a symbol, if the symbol identified by the symbol identifier is available as a stored symbol, and if there are other pending retransmission requests for the symbol, the base station retransmitting the symbol;

if the retransmission request is for a symbol, if the symbol identified by the symbol identifier is available as a stored symbol, and if the packet identified by the packet identifier has a size larger than a threshold, the base station retransmitting the symbol; and if the retransmission request is for a symbol, if the packet identified by the packet identifier is available as a stored packet, and if the packet identified by the packet identifier has a size not larger than the threshold, the base station retransmitting the packet.

27. A method in an OFDM transmitter, the method comprising:

transmitting an OFDM symbol, each symbol including at least one packet, each packet having content for a respective receiver;

in the event of unsuccessful reception by at least one receiver, receiving a retransmission request in respect of the OFDM symbol;

selecting between handling the retransmission request(s) by retransmitting the entire OFDM symbol or by retransmitting at least one particular packet of the OFDM symbol in one or more new OFDM symbols;

retransmitting in accordance with the selection.

28. The method of claim 27 further comprising:

if the retransmission request is for a packet, and if the packet identified by the packet identifier is available as a stored packet, retransmitting the packet.

29. The method of claim 27 further comprising:

if the retransmission request is for a symbol, if the symbol identified by a symbol identifier is available as a stored symbol, and if there are other pending retransmission requests for the symbol, retransmitting the symbol.

30. The method of claim 27 further comprising:

the receiving a retransmission request comprising a packet identifier and a symbol identifier; and if the retransmission request is for a symbol, if the symbol identified by the symbol identifier is available as a stored symbol, and if a packet identified by the packet identifier has a size larger than a threshold, retransmitting the symbol.

31. The method of claim 27 further comprising:

the receiving a retransmission request comprising a packet identifier and a symbol identifier if the retransmission request is for a symbol, if a packet identified by the packet identifier is available as a stored packet, and if the packet identified by the packet identifier has a size not larger than a threshold, retransmitting the packet.

32. A method by a remote unit in a radio communication system which employs Orthogonal Frequency Division Multiplexing, the method comprising the steps of:

receiving received OFDM symbols from a base station, each symbol including at least one packet, at least some symbols containing multiple packets, each packet including an address and a payload, the symbols collectively including packets addressed to the remote unit and packets addressed to other remote units, performing soft-combining of a received symbol and a stored symbol corresponding to the received symbol if present;

for each packet contained in the received symbol that is addressed to the remote unit, determining if there is an error in the payload of the packet, and if so requesting that the packet be retransmitted.

* * * * *

UNITED STATES PATENT AND TRADEMARK OFFICE
CERTIFICATE OF CORRECTION

PATENT NO.       : 7,110,351 B2
APPLICATION NO.  : 09/739367
DATED            : September 19, 2006
INVENTOR(S)      : David G. Steer et al.

It is certified that error appears in the above-identified patent and that said Letters Patent is hereby corrected as shown below:

Column 15, claim 27, line 22, "…retransmitting at least one particular packet…" should be --…retransmitting particular packets…--.

Signed and Sealed this

Ninth Day of January, 2007

JON W. DUDAS
*Director of the United States Patent and Trademark Office*